United States Patent
Yang

(10) Patent No.: US 9,787,834 B2
(45) Date of Patent: Oct. 10, 2017

(54) MULTI-CONTENT MEDIA COMMUNICATIONS METHOD, APPARATUS, AND SYSTEM

(71) Applicant: Huawei Technologies Co., Ltd., Shenzhen (CN)

(72) Inventor: Weiwei Yang, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/014,252

(22) Filed: Feb. 3, 2016

(65) Prior Publication Data

US 2016/0156778 A1 Jun. 2, 2016

Related U.S. Application Data

(63) Continuation of application No. PCT/CN2014/077216, filed on May 12, 2014.

(30) Foreign Application Priority Data

Aug. 9, 2013 (CN) .......................... 2013 1 0349246

(51) Int. Cl.
*H04N 7/14* (2006.01)
*H04M 3/487* (2006.01)
(Continued)

(52) U.S. Cl.
CPC ...... *H04M 3/4878* (2013.01); *H04L 12/1822* (2013.01); *H04L 12/1827* (2013.01);
(Continued)

(58) Field of Classification Search
USPC ......... 348/14.08, 14.09, 14.01, 14.1, 211.12; 379/114.13
See application file for complete search history.

(56) References Cited

U.S. PATENT DOCUMENTS

2002/0065928 A1 5/2002 Senga et al.
2006/0284786 A1 12/2006 Takano et al.
(Continued)

FOREIGN PATENT DOCUMENTS

CN 1357995 A 7/2002
CN 101291417 A 10/2008
(Continued)

OTHER PUBLICATIONS

Partial English Translation and Abstract of Chinese Patent Application No. CN101505226, Part 1, Jan. 26, 2016, 8 pages.
(Continued)

*Primary Examiner* — Yosef K Laekemariam
(74) *Attorney, Agent, or Firm* — Fish & Richardson P.C.

(57) ABSTRACT

A multi-content media communications method, apparatus, and system which implement switching between media captures of multiple sites, and media content receiving and sending parties can negotiate about switching content and a switching policy includes, sending a first media advertisement message to a first media using apparatus, receiving a first media configuring message sent by the first media using apparatus, where the first media configuring message includes an individual media capture and/or a multi-content media capture that is selected by the first media using apparatus according to the first media advertisement message, and sending a corresponding media stream to the first media using apparatus according to the selected individual media capture and/or multi-content media capture.

16 Claims, 5 Drawing Sheets

(51) Int. Cl.
  *H04L 12/58* (2006.01)
  *H04L 12/18* (2006.01)
  *H04L 29/06* (2006.01)
  *H04N 5/247* (2006.01)
  *H04N 5/77* (2006.01)
  *H04N 7/15* (2006.01)

(52) U.S. Cl.
  CPC .......... *H04L 51/10* (2013.01); *H04L 65/1083* (2013.01); *H04L 65/403* (2013.01); *H04N 5/247* (2013.01); *H04N 5/77* (2013.01); *H04N 7/152* (2013.01)

(56) References Cited

U.S. PATENT DOCUMENTS

| | | |
|---|---|---|
| 2009/0210789 A1 | 8/2009 | Thakkar et al. |
| 2010/0242091 A1* | 9/2010 | Xu .......................... G06F 21/10 726/3 |
| 2011/0149810 A1* | 6/2011 | Koren .................. H04L 12/185 370/261 |
| 2011/0261151 A1 | 10/2011 | Wang et al. |
| 2011/0292161 A1 | 12/2011 | Sharon et al. |
| 2012/0200658 A1 | 8/2012 | Duckworth et al. |
| 2012/0236106 A1 | 9/2012 | Wu et al. |

FOREIGN PATENT DOCUMENTS

| | | |
|---|---|---|
| CN | 101341746 A | 1/2009 |
| CN | 101505226 A | 8/2009 |
| CN | 101959051 A | 1/2011 |
| CN | 102055949 A | 5/2011 |
| CN | 102571848 A | 7/2012 |
| CN | 102843542 A | 12/2012 |
| EP | 2437491 A1 | 4/2012 |
| EP | 2541928 A1 | 1/2013 |
| JP | 09321883 A | 12/1997 |
| JP | 2006350260 | 12/2006 |
| JP | 2012170069 | 9/2012 |
| JP | 2013531934 | 8/2013 |
| RU | 2010133959 A | 2/2012 |

OTHER PUBLICATIONS

Partial English Translation and Abstract of Chinese Patent Application No. CN101505226, Part 2, Jan. 26, 2016, 4 pages.
Foreign Communication From a Counterpart Application, European Application No. 14834551.5, Extended European Search Report dated May 3, 2016, 7 pages.
Foreign Communication From a Counterpart Application, PCT Application No. PCT/CN2014/077216, International Search Report dated Jul. 25, 2014, 2 pages.
Foreign Communication From a Counterpart Application, PCT Application No. PCT/CN2014/077216, Written Opinion dated Jul. 25, 2014, 16 pages.
Office action issued in Chinese Application No. 20130349246.5 dated Jan. 24, 2017, 8 pages.
A. Romanow, et al., Framework for Telepresense Multi-Streams; draft-itf-clue-framework-06.txt, CLUE WG Internet Draft, [online], USA, Internet Engineering Task Force, Jul. 6, 2012, pp. 1-35.
Office Action issued in Japanese Patent Application No. 2016-532212, dated Mar. 21, 2017, 9 pages.
Notice of Allowance issued in Russian Application No. 2016108010, dated Mar. 20, 2017, and letter pertaining to grant details in English; 18 pages.

* cited by examiner

MULTI-CONTENT MEDIA COMMUNICATIONS METHOD, APPARATUS, AND SYSTEM

CROSS-REFERENCE TO RELATED APPLICATIONS

This application is a continuation of International Application No. PCT/CN2014/077216, filed on May 12, 2014, which claims priority to Chinese Patent Application No. 201310349246.5, filed on Aug. 9, 2013, both of which are hereby incorporated by reference in their entireties.

TECHNICAL FIELD

Embodiments of the present disclosure relate to network communications technologies, and in particular, to a multi-content media communications method, apparatus, and system.

BACKGROUND

With the development of the video conference field, a user conference site evolves from one camera, one active video, and one active image display to multiple cameras, multiple active videos, and multiple active image displays. The multiple cameras, multiple active videos, and multiple active image displayers in a same site are associated by means of a physical or logical relationship. A site A is a three-screen site, a site B is a dual-screen site, and a site C is a single-screen site. A camera 1 of the site A can capture an image of an attendee at a position 1 in the site A, and the image is displayed on a screen 1 of the site A, site B, or site C.

In a conventional telepresence technology, a multi-screen and multi-display demand scenario is introduced, in which it is allowed that corresponding image content is displayed according to a rule (for example, an activity level) in a conference. An image associated with a position is defined as a capture scene, and different image display manners of a same site are defined as different capture scene entries (CSE). In the prior art, switching between images, namely, different capture scene instances, can only be provided based on a same site, for example, switching to an image with a high activity level in a same site.

A problem in the prior art is that switching between images can be provided only based on a same capture scene.

SUMMARY

Embodiments of the present disclosure provide a multi-content media communications method, apparatus, and system, which are used to solve the problem in the prior art that switching between images can be performed only based on a same capture scene.

According to a first aspect, an embodiment of the present disclosure provides a multi-content media communications method, including: sending, by a first media providing apparatus, a first media advertisement message to a first media using apparatus, where the first media advertisement message includes at least one individual media capture carrying a capture identifier and capture attribute information, and at least one multi-content media capture carrying a capture identifier; receiving, by the first media providing apparatus, a first media configuring message sent by the first media using apparatus, where the first media configuring message includes an individual media capture or a multi-content media capture that is selected by the first media using apparatus according to the first media advertisement message, and sending, by the first media providing apparatus, a corresponding media stream to the first media using apparatus according to the selected individual media capture or multi-content media capture.

With reference to the first aspect, in a first implementation manner of the first aspect, the first media advertisement message further includes at least one capture scene entry carrying an entry identifier, where each capture scene entry includes at least one individual media capture collected at a same scene or at least one multi-content media capture.

With reference to the first implementation manner of the first aspect, in a second implementation manner of the first aspect, the first media providing apparatus is further a conference center, and before sending, by a first media providing apparatus, a first media advertisement message to a first media using apparatus, the method further includes: receiving, by the conference center, a second media advertisement message sent by a first media using apparatus of each site in a multi-party conference, where the second media advertisement message includes at least one individual media capture carrying a capture identifier and capture attribute information, or at least one multi-content media capture carrying a capture identifier; generating, by the conference center, the first media advertisement message according to the second media advertisement message, and when identifier conflict occurs between individual media captures, multi-content media captures, and capture scene entries of different sites, performing, by the conference center, renumbering, so as to ensure that the individual media capture and the multi-content media capture in the first media advertisement message each have a unique capture identifier, and the capture scene entry has a unique entry identifier.

With reference to the first aspect or the first implementation manner of the first aspect, in a third implementation manner of the first aspect, the method further includes: setting, by the first media providing apparatus, encoding group attribute information in the individual media capture and/or the multi-content media capture.

With reference to the first aspect or the first implementation manner of the first aspect, in a fourth implementation manner of the first aspect, the multi-content media capture is compounded of more than one individual media capture in the first media advertisement message, which includes that: the more than one individual media capture is compounded in a temporal or spatial manner, where the compounding manner is set by adding an attribute value of the maximum number of captures to the multi-content media capture, where when the attribute value of the maximum number of captures is 1, it indicates that the more than one individual media capture is compounded according to time, and when the attribute value of the maximum number of captures is greater than 1, it indicates that the more than one individual media capture is compounded according to space.

With reference to the fourth implementation manner of the first aspect, in a fifth implementation manner of the first aspect, that when the attribute value of the maximum number of captures is greater than 1, it indicates that the more than one individual media capture is compounded according to space includes: adding a capture area attribute to the multi-content media capture to indicate information about spatial composition positions of different individual media captures.

With reference to the first aspect or the first implementation manner of the first aspect, in a sixth implementation manner of the first aspect, the multi-content media capture further includes: compounding policy information for determining a rule according to which content in the multi-content media capture is displayed.

With reference to the first aspect or the first implementation manner of the first aspect, in a seventh implementation manner of the first aspect: when the first media advertisement message includes more than one multi-content media capture carrying a capture identifier, the first media providing apparatus sets a scene synchronization attribute in different multi-content media captures, where different multi-content media captures with a same value of the scene synchronization attribute simultaneously perform switching of individual media captures, so as to ensure that individual media captures after the switching come from a same capture scene.

According to a second aspect, an embodiment of the present disclosure provides a first media providing apparatus, including: a sending module configured to send a first media advertisement message to a first media using apparatus, where the first media advertisement message includes at least one individual media capture carrying a capture identifier and capture attribute information, and at least one multi-content media capture carrying a capture identifier, and a receiving module configured to receive a first media configuring message sent by the first media using apparatus, where the first media configuring message includes an individual media capture or a multi-content media capture that is selected by the first media using apparatus according to the first media advertisement message, where the sending module is further configured to send a corresponding media stream to the first media using apparatus according to the individual media capture and/or the multi-content media capture included in the first media configuring message received by the receiving module.

With reference to the second aspect, in a first implementation manner of the second aspect, the first media advertisement message further includes at least one capture scene entry carrying an entry identifier, where each capture scene entry includes at least one individual media capture collected at a same scene and/or at least one multi-content media capture.

With reference to the first implementation manner of the second aspect, in a second implementation manner of the second aspect, the first media providing apparatus is further a conference center, and the receiving module is further configured to: before the sending module sends the first media advertisement message to the first media using apparatus, receive a second media advertisement message sent by each site in a multi-party conference, where the second media advertisement message includes at least one individual media capture carrying a capture identifier and capture attribute information, or at least one multi-content media capture carrying a capture identifier, and correspondingly, the first media providing apparatus further includes: a processing module configured to generate the first media advertisement message according to the second media advertisement message, and the processing module is further configured to: when identifier conflict occurs between individual media captures, multi-content media captures, and capture scene entries of different sites, perform, by the conference center, renumbering, so as to ensure that the individual media capture and the multi-content media capture in the first media advertisement message each have a unique capture identifier, and the capture scene entry has a unique entry identifier.

With reference to the second aspect or the first implementation manner of the second aspect, in a third implementation manner of the second aspect, the processing module is further configured to: set encoding group attribute information in the individual media capture and/or the multi-content media capture.

With reference to the second aspect or the first implementation manner of the second aspect, in a fourth implementation manner of the second aspect, the multi-content media capture is compounded of more than one individual media capture in the first media advertisement message, which includes that: the more than one individual media capture is compounded in a temporal or spatial manner, where the compounding manner is set by adding an attribute value of the maximum number of captures to the multi-content media capture, where when the attribute value of the maximum number of captures is 1, it indicates that the more than one individual media capture is compounded according to time, and when the attribute value of the maximum number of captures is greater than 1, it indicates that the more than one individual media capture is compounded according to space.

With reference to the fourth implementation manner of the second aspect, in a fifth implementation manner of the second aspect, that when the attribute value of the maximum number of captures is greater than 1, it indicates that the more than one individual media capture is compounded according to space includes: adding a capture area attribute to the multi-content media capture to indicate information about spatial composition positions of different individual media captures.

With reference to the second aspect or the first implementation manner of the second aspect, in a sixth implementation manner of the second aspect, the multi-content media capture further includes: compounding policy information for determining a rule according to which content in the multi-content media capture is displayed.

With reference to the second aspect or the first implementation manner of the second aspect, in a seventh implementation manner of the second aspect, the processing module is further configured to: when the first media advertisement message includes more than one multi-content media capture carrying a capture identifier, set a scene synchronization attribute in different multi-content media captures, where the different multi-content media captures with a same value of the scene synchronization attribute simultaneously perform switching of individual media captures, so as to ensure that individual media captures after the switching come from a same capture scene.

According to a third aspect, an embodiment of the present disclosure provides a first media using apparatus, including: a receiving module configured to receive a first media advertisement message sent by a first media providing apparatus, where the first media advertisement message includes at least one individual media capture carrying a capture identifier and capture attribute information, and at least one multi-content media capture carrying a capture identifier, and a sending module configured to receive a first media configuring message to the first media providing apparatus, where the first media configuring message includes an individual media capture or a multi-content media capture that is selected by the first media using apparatus according to the first media advertisement message, where the receiving module is further configured to receive a media stream that is sent by the first media providing apparatus and corresponds to the individual media capture and/or the multi-content media capture included in the first media configuring message; and a display module configured to display the media stream that is sent by the first media providing apparatus and corresponds to the individual media capture and/or the multi-content media capture included in the first media configuring message.

With reference to the third aspect, in a first implementation manner of the third aspect, the first media using apparatus further includes: a processing module configured to generate media content configuring options on a conference terminal according to the first media advertisement message, and generate the first media configuring message according to selection made by an attendee, where the media content configuring options include information about the multi-content media capture and individual media captures that are compounded to form the multi-content media capture in the first media advertisement message, where the sending module is further configured to send the first media configuring message to the first media providing apparatus, namely, a conference center.

With reference to the third aspect or the first implementation manner of the third aspect, in a second implementation manner of the third aspect, the first media advertisement message further includes at least one capture scene entry carrying an entry identifier, where each capture scene entry includes at least one individual media capture collected at a same scene or at least one multi-content media capture.

With reference to the third aspect or any one of the first and second implementation manners of the third aspect, in a third implementation manner of the third aspect, the sending module is further configured to: before the receiving module receives the first media advertisement message sent by the first media providing apparatus, send a second media advertisement message to the conference center, where the second media advertisement message includes at least one individual media capture carrying a capture identifier and capture attribute information, or at least one multi-content media capture carrying a capture identifier, so that the conference center generates the first media advertisement message according to the second media advertisement message.

With reference to the third aspect or any one of the first and second implementation manners of the third aspect, in a fourth implementation manner of the third aspect, the multi-content media capture is compounded of more than one individual media capture in the first media advertisement message, which includes that: the more than one individual media capture is compounded in a temporal or spatial manner, where the compounding manner is set by adding an attribute value of the maximum number of captures to the multi-content media capture, where when the attribute value of the maximum number of captures is 1, it indicates that the more than one individual media capture is compounded according to time, and when the attribute value of the maximum number of captures is greater than 1, it indicates that the more than one individual media capture is compounded according to space.

With reference to the fourth implementation manner of the third aspect, in a fifth implementation manner of the third aspect, that when the attribute value of the maximum number of captures is greater than 1, it indicates that the more than one individual media capture is compounded according to space includes: adding a capture area attribute to the multi-content media capture to indicate information about spatial composition positions of different individual media captures.

With reference to the third aspect or any one of the first and second implementation manners of the third aspect, in a sixth implementation manner of the third aspect, the multi-content media capture further includes: compounding policy information for determining a rule according to which content in the multi-content media capture is displayed.

According to a fourth aspect, an embodiment of the present disclosure provides a multi-content media communications system, including: at least one first media providing apparatus according to the second aspect or any one of the first to seventh implementation manners of the second aspect, and at least one first media using apparatus according to the third aspect or any one of the first to sixth implementation manners of the third aspect.

In the multi-content media communications method, apparatus, and system according to the embodiments of the present disclosure, the first media using apparatus receives and displays a media stream that is sent by the first media providing apparatus and corresponds to the individual media capture and/or the multi-content media capture included in the first media configuring message. Therefore, sites can provide multi-content media captures, switching between media captures provided by the sites is implemented, and media content receiving and sending parties can negotiate about switching content and a switching policy.

BRIEF DESCRIPTION OF DRAWINGS

To describe the technical solutions in the embodiments of the present disclosure or in the prior art more clearly, the following briefly introduces the accompanying drawings required for describing the embodiments or the prior art. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are a part rather than all of the embodiments of the present disclosure. All other embodiments obtained by persons of ordinary skill in the art based on the embodiments of the present disclosure without creative efforts shall fall within the protection scope of the present disclosure.

Figure 1:
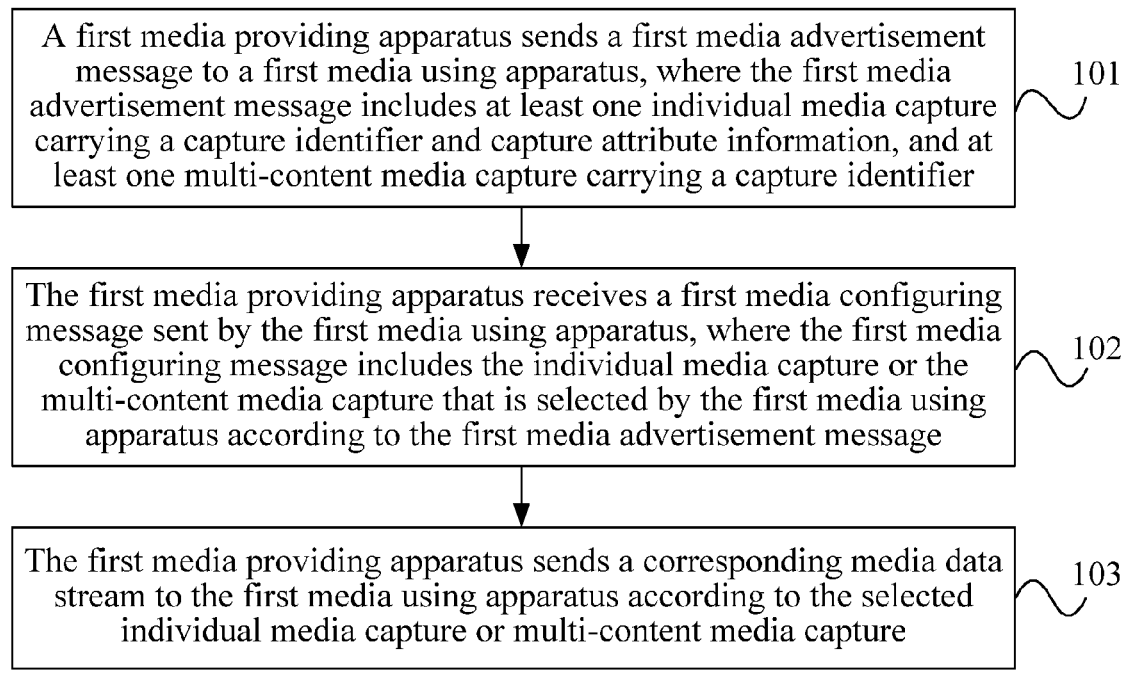
FIG. 1 is a flowchart of Embodiment 1 of a multi-content media communications method according to the present disclosure.

FIG. 1 is a flowchart of Embodiment 1 of a multi-content media communications method according to the present disclosure. This embodiment is executed by a first media providing apparatus, where the first media providing apparatus may be implemented by software and/or hardware, and in this embodiment, the method applied in a telepresence conference is used as an example. As shown in FIG. 1, the method in this embodiment may include:

Step 101: A first media providing apparatus sends a first media advertisement message to a first media using apparatus, where the first media advertisement message includes at least one individual media capture carrying a capture identifier and capture attribute information, and at least one multi-content media capture carrying a capture identifier.

The multi-content media capture is compounded of more than one individual media capture in the first media advertisement message.

In this embodiment, a telepresence conference held in two telepresence conference rooms in Shenzhen, China and Hong Kong, China is used as an example. Because it is a point-to-point two-party conference, participation of another intermediate conference device, such as a conference center, is not required.

A media capture is a basic description of media content in real-time communication, and generally represents a multimedia stream sent from a media device. If the media capture is video content, it may be referred to as a video capture (VC), and if the media capture is audio content, it may be referred to as an audio capture (AC).

In this embodiment, the media capture is classified into an individual media capture and a multi-content media capture, where the multi-content media capture may also be referred to as a compound media capture or a multi-content capture (MCC). Each individual media capture or multi-content media capture has a capture identifier. For example, in a typical three-screen telepresence conference room, three basic individual media captures may be provided, which are VC0 (Video Capture 1), VC1 (Video Capture 2), and VC2 (Video Capture 3), where VC0, VC1, and VC2 are capture identifiers of the individual media captures.

The individual media capture may also be referred to as a static media capture, and refers to a multimedia stream generated by a single fixed media collecting device, where the multimedia stream may be, for example, a single video image collected by a camera, or independent audio data generated by a microphone. In a same site, one or more individual media captures form a capture scene entry, which indicates a presentation manner for a capture scene. For example, in a three-screen telepresence site, three video images collected by three cameras may form a capture scene entry to present the site.

The multi-content media capture refers to a media capture compounded of multiple individual media captures, where a compounding manner thereof may be a spatial manner, for example, composing multiple video images or mixing multiple pieces of audio data, or a temporal manner, for example, transmitting and playing multiple video images sequentially in a temporal order or rotating multiple video images according to a specific rule (for example, a sound activity level). A content source of the multi-content media capture includes an individual media capture, a capture scene entry, or a random combination of the two. Both the multi-content media capture and the individual media capture are media captures, and therefore, may have a consistent capture characteristic, for example, an identifier, a location, or a priority.

Furthermore, the first media providing apparatus such as a conference terminal in a Shenzhen, China site sends the first media advertisement message to the first media using apparatus such as a conference terminal in a Hong Kong, China site, where the first media advertisement message includes at least one individual media capture carrying a capture identifier and capture attribute information, and at least one multi-content media capture carrying a capture identifier, and the individual media capture and the multi-content media capture are media content that may be provided by the Shenzhen site for this communication.

In this embodiment, the Shenzhen, China site is a telepresence site with three screens (corresponding to three cameras), and may provide individual media captures of three site images, where it is assumed that capture identifiers are VC0, VC1, and VC2. Using the Shenzhen site as an example, the first media providing apparatus sends the following first media advertisement message to the first media using apparatus such as the conference terminal in the Hong Kong, China site:

```
CaptureScene1
[
    Description=ShenZhenTPRoom,
    VC0{role=audience,capturearea=left},
    VC1{role=speaker,capturearea=central},
    VC2{role=audience,capturearea=right},
    MCC1(VC0, VC1, VC2){MaxCaptures:1}
]
```

In the foregoing first media advertisement message, CaptureScene1 indicates site identifier information of a capture scene of the Shenzhen site. VC0, VC1, and VC2 are three individual media captures (video captures) that may be provided by the Shenzhen site, where VC0 indicates a site video image of an attendee playing a role of an audience at a left position of the Shenzhen site, VC1 indicates a site video image of an attendee playing a role of a speaker in a central position of the Shenzhen site, and VC2 indicates a site video image of an attendee playing a role of an audience at a right position of the Shenzhen site, and a multi-content media capture (MCC1) is further included, where MCC1 is a corresponding capture identifier and is compounded of the three individual media captures VC0, VC1, and VC2 in the first media advertisement message. In the first media advertisement message, content in a { } is attribute information of a media capture, for example, role=speaker, capturearea=central and MaxCaptures:1, where the latter indicates that an attribute value of the maximum number of captures is 1, that is, only one individual media capture is provided at a given time. Other attribute information may be further included herein, for example, coordinate information and priority information of different media captures.

Step 102: The first media providing apparatus receives a first media configuring message sent by the first media using apparatus, where the first media configuring message includes the individual media capture or the multi-content media capture that is selected by the first media using apparatus according to the first media advertisement message.

Furthermore, if the Hong Kong site is a telepresence site with only one screen, video images of the three individual media captures of the Shenzhen site cannot be projected simultaneously according to a resolution of a life-size image of the site. Therefore, it may be expected that all content of the Shenzhen site is displayed only on one screen, and in this case, the multi-content media capture in the first media advertisement message sent from the Shenzhen site is selected. The first media configuring message sent by the first media using apparatus such as a device at the Hong Kong site may include the following content:

```
CaptureScene1
[
    MCC1(VC0, VC1, VC2)
]
```

Step 103: The first media providing apparatus sends a corresponding media data stream to the first media using apparatus according to the selected individual media capture or multi-content media capture.

Furthermore, the first media providing apparatus such as a device at the Shenzhen site receives the first media configuring message sent by the first media using apparatus such as the device at the Hong Kong site. Compounds, according to the first media configuring message, VC0, VC1, and VC2 in a manner of MCC1 image switching (which, herein, may be compounded in a temporal manner to present a switching effect), and sends compounded VC0, VC1, and VC2 to the first media using apparatus using a media stream.

In this embodiment, the first media providing apparatus may also be a conference center, and the conference center (or referred to as a conference server) is executed by a multipoint control unit (MCU), which may be a media resource function (MRF) in an Internet Protocol (IP) multimedia subsystem (IMS), or a conference center control entity in another conference system.

Preferably, in this embodiment, the first media advertisement message further includes at least one capture scene entry carrying an entry identifier, where each capture scene entry includes at least one individual media capture collected at a same scene and/or at least one multi-content media capture, and correspondingly, content of the multi-content media capture includes more than one individual media capture and/or capture scene entry.

Furthermore, using the Shenzhen China site as an example, the conference terminal at the Shenzhen site serving as the first media providing apparatus sends the following first media advertisement message:

```
CaptureScene1
[
    Description=ShenZhenTPRoom,
    VC0{role=audience,capturearea=left},
    VC1{role=speaker,capturearea=central},
    VC2{role=audience,capturearea=right},
    VC3{role=audience,capture=entire room},
    CSE1{VC0, VC1, VC2},
    CSE2{VC3},
    MCC1(CSE1)
]
```

VC3 (Video Capture 4) indicates an individual media capture of the entire Shenzhen site collected by a site camera after focal length adjustment, VC0, VC1, and VC2 form CSE1, which is a presentation manner of the Shenzhen site, VC3 forms CSE2, which is a second presentation manner of the Shenzhen site, and a multi-content media capture MCC1 may be formed by the capture scene entry CSE1.

In this embodiment, a first media providing apparatus sends a first media advertisement message to a first media using apparatus, where the first media advertisement message includes at least one individual media capture carrying a capture identifier and capture attribute information, and at least one multi-content media capture carrying a capture identifier, where the multi-content media capture is compounded of more than one individual media capture in the first media advertisement message. The first media providing apparatus receives a first media configuring message sent by the first media using apparatus, where the first media configuring message includes an individual media capture and/or a multi-content media capture that is selected by the first media using apparatus according to the first media advertisement message, and the first media providing apparatus sends a corresponding media stream to the first media using apparatus according to the selected individual media capture and/or multi-content media capture. Therefore, sites can provide multi-content media captures, switching between media captures provided by the sites is implemented, and media content receiving and sending parties can negotiate about switching content and a switching policy.

Figure 2:
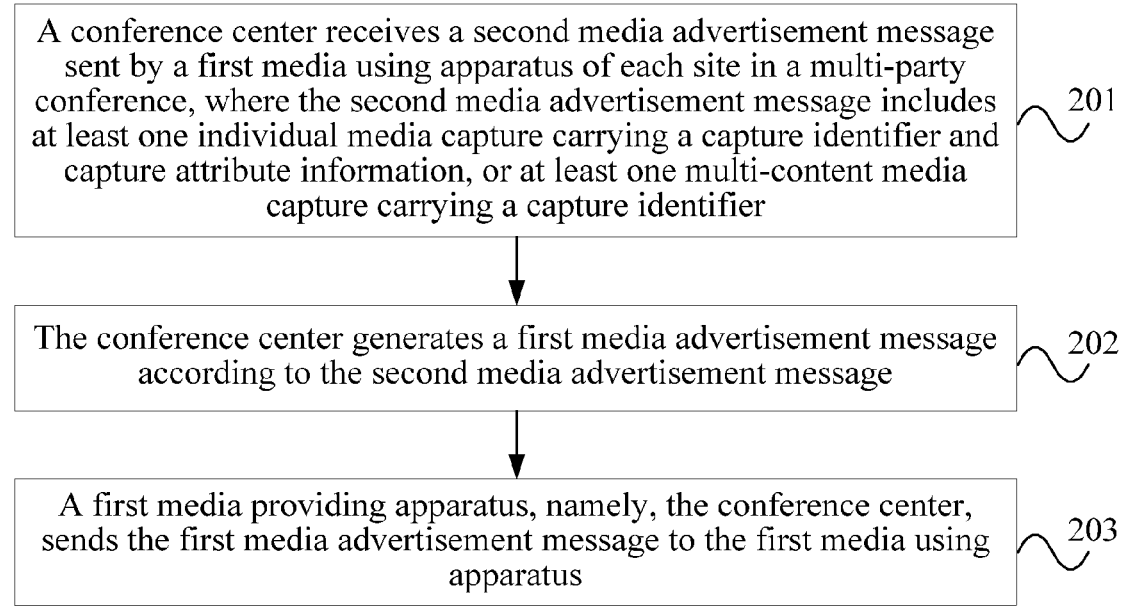
FIG. 2 is a flowchart of Embodiment 2 of a multi-content media communications method according to the present disclosure.
Figure 3:
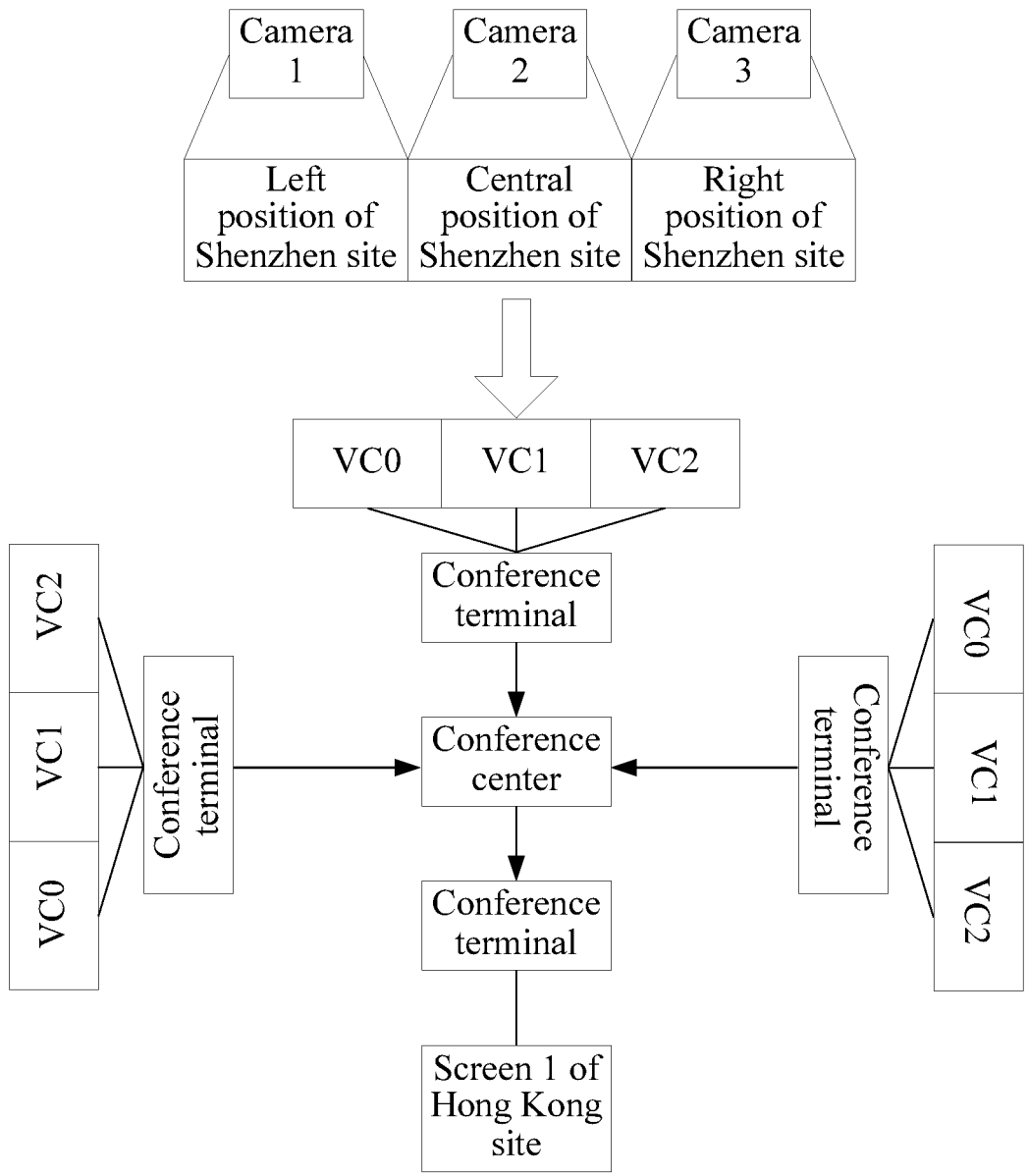
FIG. 3 is a schematic diagram of a scenario of Embodiment 2 of a multi-content media communications method according to the present disclosure.

FIG. 2 is a flowchart of Embodiment 2 of a multi-content media communications method according to the present disclosure. FIG. 3 is a schematic diagram of a scenario of Embodiment 2 of a multi-content media communications method according to the present disclosure. Based on the method embodiment shown in FIG. 1, the method in this embodiment may include:

Step 201: A conference center receives a second media advertisement message sent by a first media using apparatus of each site in a multi-party conference, where the second media advertisement message includes at least one individual media capture carrying a capture identifier and capture attribute information, or at least one multi-content media capture carrying a capture identifier.

In this embodiment, a first media providing apparatus is the conference center. A scenario of a four-party conference is used as an example, where in addition to four different sites involved in the conference, a MCU serving as an execution body of the conference center (or a conference server) is further included. The conference center MCU interacts with each conference party to obtain an individual media capture and/or a multimedia capture that may be provided by each conference party.

A telepresence conference held in four telepresence conference rooms in Shenzhen, China, Dallas, United States of America, Madrid, Spain, and Hong Kong, China is used as an example.

Furthermore, as shown in FIG. 3, it is assumed that Shenzhen, China, Dallas, United States of America, Madrid, Spain sites are each a telepresence site with three screens (corresponding to three cameras), and the Hong Kong China site is a telepresence conference room with one screen (corresponding to one camera). As media providers, the sites each may correspondingly provide a corresponding number of individual media captures, for example, the Shenzhen, China site may at least provide individual media captures, namely, VC0, VC1, and VC2, collected in real time by three cameras. As a corresponding media content receiver, the conference center MCU interacts with each site, to receive, from each site, an individual media capture carrying a capture identifier and capture attribute information and/or at least one multi-content media capture carrying a capture identifier.

The conference center MCU may obtain media captures of the Shenzhen, China site, the Dallas, United States of America site, and the Madrid, Spain site by separately using second media advertisement messages sent by different first media using apparatuses.

For example, the Shenzhen, China site sends:

```
CaptureScene1
[
    Description=ShenZhenTPRoom,
    VC0{role=audience,capturearea=left},
    VC1{role=speaker,capturearea=central},
    VC2{role=audience,capturearea=right},
    VC3{role=audience,capture=entire room},
    CSE1{VC0, VC1, VC2},
]
```
the Dallas, United States of America site sends:
```
CaptureScene1
[
    Description=DallasTPRoom,
    VC0{role=audience,capturearea=left},
    VC1{role=chairman,capturearea=central},
    VC2{role=secretary,capturearea=right},
    CSE1{VC0, VC1, VC2},
]
```
the Madrid, Spain site sends:
```
CaptureScene 1
[
    Description=MadridTPRoom,
    VC0{role=audience,capturearea=left},
    VC1{role=audience,capturearea=central},
    VC2{role=audience,capturearea=right},
    CSE1{VC0, VC1, VC2},
]
```

Step 202: The conference center generates a first media advertisement message according to the second media advertisement message.

Furthermore, the conference center may generate the first media advertisement message according to the second media advertisement message. In the independent second media advertisement message, each capture scene identifier and VC identifier are locally unique, that is, unique and searchable in this message.

When identifier conflict occurs between individual media captures, multi-content media captures, and capture scene entries of different sites, the conference center performs renumbering, so as to ensure that the individual media capture and the multi-content media capture in the first media advertisement message each have a unique capture identifier, and the capture scene entry has a unique entry identifier.

For example, the MCU performs conflict processing for second media advertisement messages received from different conference parties, and generates the following first media advertisement message:

```
Endpoint ShenZhen
CaptureSceneID1
[
    Description=ShenZhenTPConfRoom,
    VC0{role=audience,capturearea=left},
    VC1{role=speaker,capturearea=central},
    VC2{role=audience,capturearea=right},
    VC3{role=audience,capture=entire room},
    CSE1{VC0, VC1, VC2},
]
Endpoint Dallas
CaptureSceneID2
[
    Description=DallasTPConfRoom,
    VC4{role=audience,capturearea=left},
    VC5{role=chairman,capturearea=central},
    VC6{role=secretary,capturearea=right},
    CSE2{VC4, VC5, VC6},
]
Endpoint Madrid
CaptureSceneID3
[
    Description=MadridTPConfRoom,
    VC7{role=audience,capturearea=left},
    VC8{role=audience,capturearea=central},
    VC9{role=audience,capturearea=right},
    CSE3{VC7, VC8, VC9},
]
```

Because conflict occurs between identifiers of capture scenes, individual media captures, and capture scene entries in media advertisement messages received from Shenzhen, Dallas, and Madrid, the MCU renumbers different capture scenes, individual media captures, and capture scene entries, so as to ensure that their identifiers are unique in the first media advertisement message generated by the MCU.

The MCU may further generate the following first media advertisement message including one or more multi-content media captures according to the provided individual media capture and/or multi-content media capture:

1. The first media advertisement message includes one multi-content media capture:

```
CaptureScene4
[
    VC3{role=audience,capture=entire room},
    VC4{role=audience,capturearea=left},
    VC5{role=chairman,capturearea=central},
    VC6{role=secretary,capturearea=right},
    VC7{role=audience,capturearea=left},
    VC8{role=audience,capturearea=central},
    VC9{role=audience,capturearea=right},
    MCC1(VC4, VC5, VC6, VC7, VC8, VC9),
    CSE4(MCC1, VC3)
]
```

In this example, CaptureScene4 is a fourth capture scene that may be provided by the MCU. Compared with CaptureScene1, CaptureScene2, and CaptureScene3 respectively representing the Shenzhen site, the Dallas site, and the Madrid site, CaptureScene4 herein is more equivalent to a virtual capture scene. Herein, the MCU defines a multi-content media capture MCC1, where MCC1 is formed by compounding based on individual media captures VC4, VC5, VC6, VC7, VC8, and VC9, of which a compounding manner may be switching according to time or compounding according to space, as specified by a parameter. Further, the MCU may provide a capture scene entry CSE4 including the multi-content media capture MCC1, that is, display the virtual capture scene CaptureScene4 using images of MCC1 and VC3.

2. The first media advertisement message includes multiple multi-content media captures:

```
CaptureScene5
[
    VC0{role=audience,capturearea=left},
    VC1{role=speaker,capturearea=central},
    VC2{role=audience,capturearea=right},
    VC4{role=audience,capturearea=left},
    VC5{role=chairman,capturearea=central},
    VC6{role=secretary,capturearea=right},
    VC7{role=audience,capturearea=left},
    VC8{role=audience,capturearea=central},
    VC9{role=audience,capturearea=right},
    MCC2(VC0, VC4, VC7),
    MCC3(VC1, VC5, VC8),
    MCC4(VC2, VC6, VC9),
    CSE5(MCC1, MCC2, MCC3)
]
```

In this example, CaptureScene5 is another capture scene that may be provided by the MCU. Compared with CaptureScene1, CaptureScene2, and CaptureScene3 respectively representing the Shenzhen site, the Dallas site, and the Madrid site, CaptureScene5 herein is also a virtual capture scene. Herein, the MCU defines multiple multi-content media captures, where MCC2 is formed by compounding based on individual media captures VC0, VC4, and VC7 that represent left areas in the Shenzhen, Dallas, and Madrid sites; MCC3 is formed by compounding based on individual media captures VC1, VC5, and VC8 that represent central areas in the Shenzhen, Dallas, and Madrid sites, and MCC4 is formed by compounding based on individual media captures VC2, VC6, and VC9 that represent right areas in the Shenzhen, Dallas, and Madrid sites. Each compounding manner herein may be switching according to time or compounding according to space, as specified by a parameter. Further, the MCU may provide a capture scene entry CSE5 including the multi-content media captures MCC2, MCC3, and MCC4, that is, display the virtual capture scene CaptureScene5 using images of MCC2, MCC3, and MCC4.

In this embodiment, the first media advertisement messages sent to the sites may be the same or different, for example, a first media advertisement message sent to a site may not include an individual media capture of the site. Therefore, a media capture included in a first media advertisement message sent by the MCU to the Shenzhen site may be may be compounded of media captures provided by the Dallas site, the Madrid site, and the Hong Kong site.

Step 203: A first media providing apparatus, namely, the conference center, sends the first media advertisement message to the first media using apparatus.

The principle of this step is similar to that of the embodiment shown in FIG. 1, and is not described again herein.

In this embodiment, a conference center receives a second media advertisement message sent by a first media using apparatus of each site in a multi-party conference, where the second media advertisement message includes at least one individual media capture carrying a capture identifier and capture attribute information and/or at least one multi-content media capture carrying a capture identifier. The conference center generates a first media advertisement message according to the second media advertisement message, and a first media providing apparatus, namely, the conference center, sends the first media advertisement message to the first media using apparatus. Therefore, switching between media captures provided by sites is implemented, and media content receiving and sending parties can negotiate about switching content and a switching policy.

In Embodiment 3 of a multi-content media communications method according to the present disclosure, based on the method embodiments shown in FIG. 1 and FIG. 2, in this embodiment, the first media providing apparatus sets encoding group attribute information in an individual media capture and/or a multi-content media capture, so as to determine encoding that can be correspondingly used for the individual media capture and/or multi-content media capture, and the number of media streams that can be simultaneously sent by the first media providing apparatus.

Furthermore, the encoding group attribute information indicates the number of encoding instances that can be used, and a specific corresponding encoding parameter, for example, a resolution. By setting encoding group attribute information for a media capture, encoding that can be used for the media capture, and the number of media streams that can be simultaneously encoded, which is determined according to the number of encoding instances included by an encoding group, that is, the number of media streams that can be simultaneously sent, can be determined.

For example, in a multi-content media capture, a form of the encoding group attribute information is set as follows:

MCC2(VC0, VC4, VC7){encoding group1}, which indicates that MCC2 is encoded using an encoding group "encoding group1". In this way, an encoding attribute of a video capture in MCC2 is decided by an encoding instance included in the "encoding group1". For example, if "encoding group1" only includes one 1080p (progressive scan) encoding instance, it indicates that a maximum resolution of the video capture provided by MCC2 is 1080p, and only one 1080p video image can be generated at a given time.

Preferably, in this embodiment, the multi-content media capture is compounded of more than one individual media capture in the first media advertisement message, which includes that: the more than one individual media capture is compounded in a temporal or spatial manner.

The compounding manner is set by adding an attribute value of the maximum number of captures to the multi-content media capture, and indicates the maximum number of individual media captures that can be simultaneously encoded in the multi-content media capture. When the attribute value of the maximum number of captures is 1, it indicates that the more than one individual media capture is compounded according to time, and when the attribute value of the maximum number of captures is greater than 1, it indicates that the more than one individual media capture is compounded according to space.

Furthermore, multiple individual media captures may be compounded in a temporal or spatial manner, to achieve an effect of switching between the multiple media captures or composition of the multiple media captures. For example, the switching may be rotated switching of different media capture images, and the composition may be mixing of different sounds or composition of different media capture images. In this embodiment, a compounding manner of the individual media captures is set by adding an attribute value of the maximum number of captures (MaxCaptures) to the multi-content media capture. For example, in MCC1(VC4, VC5, VC6, VC7, VC8, VC9){MaxCaptures:1}, when the value of MaxCaptures is 1, it indicates that only one individual media capture is provided at a same time, that is, the more than one individual media capture is switched according to time, and in this process, a time for which each individual media capture lasts and a triggering condition for switching between different individual media captures may be set using another attribute or in another manner. When the value of MaxCaptures is greater than 1, it indicates that more than one individual media capture is provided at a same time, that is, the more than one individual media capture is compounded according to space. A value of MaxCaptures indicates the number of individual media capture images that are simultaneously displayed in a same image, and relative positions and distances for spatial compounding of different individual media captures, whether it is picture in picture, or the like may be set using other attributes or in other manners.

Preferably, in this embodiment, that when the attribute value of the maximum number of captures is greater than 1, it indicates that the more than one individual media capture is compounded according to space may include: adding a capture area attribute to the multi-content media capture to indicate information about spatial composition positions of different individual media captures.

Furthermore, for example, MCC1 (VC4, VC5, VC6, VC7, VC8, VC9){MaxCaptures:2} indicates that two different individual media captures are compounded to form a multi-content media capture, and may further carry a capture area attribute to indicate information about spatial composition positions of the two different individual media captures, for example, one is placed on the left of the other or one is place above the other or the like.

Preferably, in this embodiment, the multi-content media capture further includes: compounding policy information for determining a rule according to which content in the multi-content media capture is displayed.

For example, in the following multi-content media capture:

MCC2(VC0, VC4, VC7){policy=voice activity},

"policy" may have different policy values. For example, "voice activity" indicates that multiple media captures are compounded or switched according to a voice activity level or volume, "round robin" indicates that multiple media captures are compounded or switched in a manner of sequential rotation according to time, and "role" indicates that multiple media captures are compounded or switched according to roles that the media captures represent.

Preferably, in this embodiment, when the first media advertisement message includes more than one multi-content media capture carrying a capture identifier, the first media providing apparatus sets a scene synchronization attribute in different multi-content media captures, where different multi-content media captures with a same value of the scene synchronization attribute simultaneously perform switching of individual media captures, so as to ensure that individual media captures after the switching come from a same capture scene.

For example, the scene synchronization attribute is set as {Scene-synchID1} in the multi-content media captures, and a form of the first media advertisement message is:

CaptureScene5
[
   VC0{role=audience,capturearea=left},
   VC1{role=speaker,capturearea=central},
   VC2{role=audience,capturearea=right},
   VC4{role=audience,capturearea=left},
   VC5{role=chairman,capturearea=central},
   VC6{role=secretary,capturearea=right},
   VC7{role=audience,capturearea=left},
   VC8{role=audience,capturearea=central},
   VC9{role=audience,capturearea=right}, -continued MCC2(VC0, VC4, VC7) {Scene-synchID1},
   MCC3(VC1, VC5, VC8) {Scene-synchID1},
   MCC4(VC2, VC6, VC9) {Scene-synchID1},
   CSE5(MCC1, MCC2, MCC3)
]

It indicates that when compounding (for example, temporal switching or spatial composition) is performed for the multi-content media captures, it is required to ensure that individual media captures after compounding for several multi-content media captures in the first media advertisement message that have a same scene synchronization attribute (namely, Scene-synchID1) come from a same capture scene, where VC0, VC1, and VC2 are from the Shenzhen site; VC4, VC5, and VC6 are from the Dallas site; and VC7, VC8, and VC9 are from the Madrid site. Therefore, in an actual application, it indicates that when MCC2 switches from VC0 to VC4, MCC3 and MCC4 respectively switch from VC1 to VC5 and from VC2 to VC6.

Preferably, in this embodiment, the individual media capture and/or the multi-content media capture included in the first media configuring message is: all or some of the individual media capture and/or the multi-content media capture included in the first media advertisement message.

For example, the first media advertisement message includes the following information:

CaptureScene5
[
   VC0{role=audience,capturearea=left},
   VC1{role=speaker,capturearea=central},
   VC2{role=audience,capturearea=right},
   VC4{role=audience,capturearea=left},
   VC5{role=chairman,capturearea=central},
   VC6{role=secretary,capturearea=right},
   VC7{role=audience,capturearea=left},
   VC8{role=audience,capturearea=central},
   VC9{role=audience,capturearea=right},
   MCC2(VC0, VC4, VC7) {Scene-synchID1},
   MCC3(VC1, VC5, VC8) {Scene-synchID1},
   MCC4(VC2, VC6, VC9) {Scene-synchID1},
   CSE5(MCC1, MCC2, MCC3)
]

If it is only expected that media capture images of the Shenzhen site and the Dallas site are displayed in a Hong Kong site, the first media configuring message may include the following content:

CaptureScene5
[
   MCC2(VC0, VC4) {Scene-synchID1},
   MCC3(VC1, VC5) {Scene-synchID1},
   MCC4(VC2, VC6) {Scene-synchID1},
   CSE5(MCC1, MCC2, MCC3)
]

That is, some media captures in the first media advertisement message of the MCU are selected.

In this embodiment, a first media providing apparatus sets encoding group attribute information in an individual media capture and/or a multi-content media capture, so as to determine encoding that can be correspondingly used for the individual media capture and/or the multi-content media capture, and the number of media streams that can be simultaneously sent by the first media providing apparatus.

Each site can provide a multi-content media capture, and the multi-content media capture is compounded of more than one individual media capture in a first media advertisement message, which includes that: the more than one individual media capture is compounded in a temporal or spatial manner. The compounding manner is set by adding an attribute value of the maximum number of captures to the multi-content media capture, and indicates the maximum number of individual media captures that can be simultaneously encoded in the multi-content media capture. When the attribute value of the maximum number of captures is 1, it indicates that the more than one individual media capture is compounded according to time, and when the attribute value of the maximum number of captures is greater than 1, it indicates that the more than one individual media capture is compounded according to space, which, in this case, may include: adding a capture area attribute to the multi-content media capture to indicate information about spatial composition positions of different individual media captures. The multi-content media capture further includes: compounding policy information for determining a rule according to which content in the multi-content media capture is displayed. When the first media advertisement message includes more than one multi-content media capture carrying a capture identifier, the first media providing apparatus sets a scene synchronization attribute in different multi-content media captures, where different multi-content media captures with a same value of the scene synchronization attribute simultaneously perform switching of individual media captures, so as to ensure that individual media captures after the switching come from a same capture scene. Therefore, switching between media captures provided by sites is implemented, and media content receiving and sending parties can negotiate about switching content and a switching policy.

Figure 4:
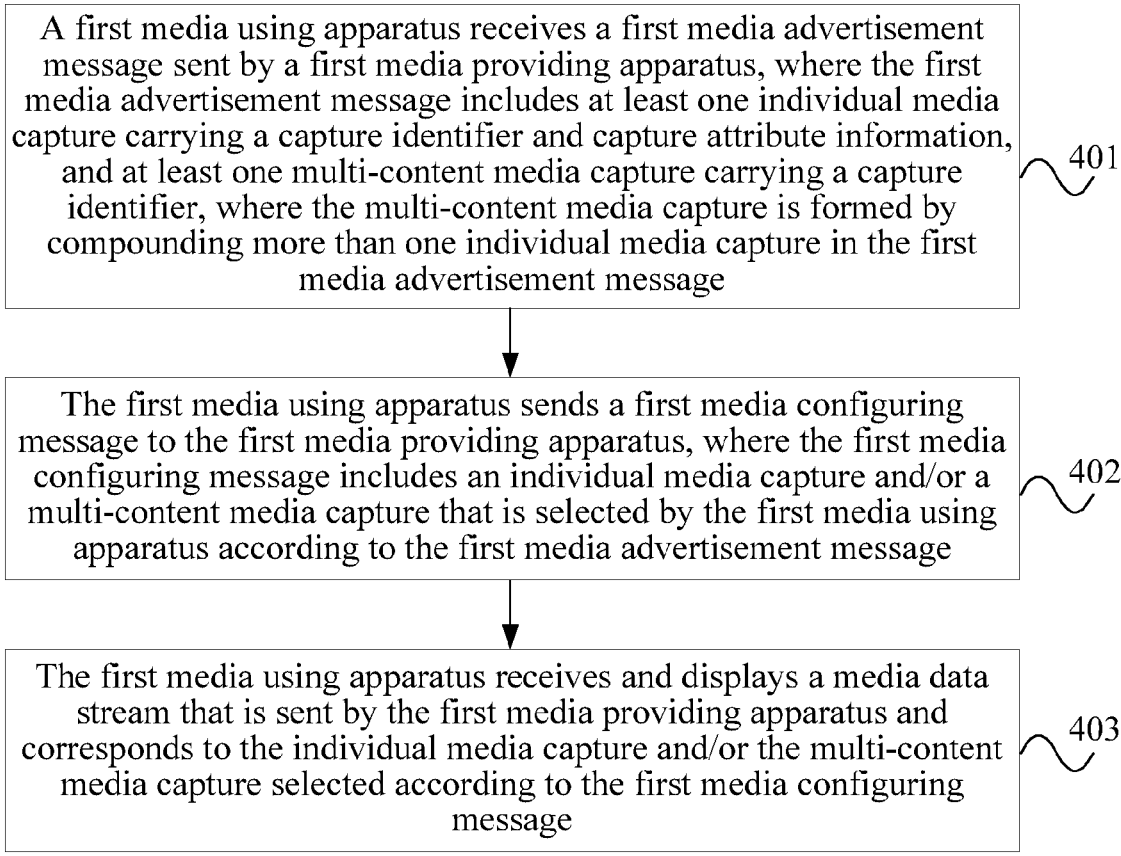
FIG. 4 is a flowchart of Embodiment 4 of a multi-content media communications method according to the present disclosure.

FIG. 4 is a flowchart of Embodiment 4 of a multi-content media communications method according to the present disclosure. This embodiment is executed by a first media using apparatus, where the first media using apparatus may be implemented by software and/or hardware, and in this embodiment, application in a telepresence conference is used as an example. As shown in FIG. 4, the method in this embodiment may include:

Step 401: A first media using apparatus receives a first media advertisement message sent by a first media providing apparatus, where the first media advertisement message includes at least one individual media capture carrying a capture identifier and capture attribute information, and at least one multi-content media capture carrying a capture identifier, where the multi-content media capture is formed by compounding more than one individual media capture in the first media advertisement message.

In this embodiment, a telepresence conference held in two telepresence conference rooms in Shenzhen, China and Hong Kong, China is used as an example. Because it is a point-to-point two-party conference, participation of another intermediate conference device, such as a conference center, is not required.

Shenzhen, China is a telepresence site with three screens (corresponding to three cameras), and may provide individual media captures of three site images, where it is assumed that capture identifiers, are VC0, VC1, and VC2. Using the Shenzhen site as an example, the first media providing apparatus sends the following first media advertisement message:

```
CaptureScene1
[
    Description=ShenZhenTPRoom,
    VC0{role=audience,capturearea=left},
    VC1{role=speaker,capturearea=central},
    VC2{role=audience,capturearea=right},
    MCC1(VC0, VC1, VC2)
]
```

A conference terminal of the Hong Kong, China site serving as the first media using apparatus receives the first media advertisement message, where in the first media advertisement message, CaptureScene1 indicates site identifier information of a capture scene of the Shenzhen site. VC0, VC1, and VC2 are three individual media captures (video captures) that may be provided by the Shenzhen site, where VC0 indicates a site video image of an attendee playing a role of an audience at a left position of the Shenzhen site, VC1 indicates a site video image of an attendee playing a role of a speaker in a central position of the Shenzhen site, and VC2 indicates a site video image of an attendee playing a role of an audience at a right position of the Shenzhen site, and a multi-content media capture MCC1 is further included, where MCC1 is a corresponding capture identifier and is a providing manner formed by compounding based on the three individual media captures VC0, VC1, and VC2 in the first media advertisement message. In the first media advertisement message, content in a { } is attribute information of a media capture, for example, role=speaker,capturearea=central, and other attribute information may be further included herein, for example, coordinate information and priority information of different media captures.

Step 402: The first media using apparatus sends a first media configuring message to the first media providing apparatus, where the first media configuring message includes an individual media capture and/or a multi-content media capture that is selected by the first media using apparatus according to the first media advertisement message.

Furthermore, if the Hong Kong site is a telepresence site with only one screen, video images of the three individual media captures of the Shenzhen site cannot be projected simultaneously according to a resolution of a life-size image of the site. Therefore, it may be expected that all content of the Shenzhen site is displayed only on one screen, and in this case, the multi-content media capture in the first media advertisement message of the Shenzhen site is selected. The first media configuring message sent by the first media using apparatus such as the conference terminal of the Hong Kong site may include the following content:

```
CaptureScene1
[
    MCC1(VC0, VC1, VC2)
]
```

Step 403: The first media using apparatus receives and displays a media data stream that is sent by the first media providing apparatus and corresponds to the individual media capture and/or the multi-content media capture selected according to the first media configuring message.

Furthermore, the first media using apparatus such as the conference terminal of the Hong Kong site receives the media stream that is sent by the first media providing apparatus such as a device at the Shenzhen site and corresponds to the individual media capture and/or the multi-content media capture selected according to the first media configuring message. For example, VC0, VC1, and VC2 are compounded in a manner of MCC1 image switching (which, herein, may be compounded in a temporal manner to present a switching effect), and are sent to the first media using apparatus using a media stream.

In this embodiment, a first media using apparatus receives a first media advertisement message sent by a first media providing apparatus, where the first media advertisement message includes at least one individual media capture carrying a capture identifier and capture attribute information, and at least one multi-content media capture carrying a capture identifier, where the multi-content media capture is compounded of more than one individual media capture in the first media advertisement message. The first media using apparatus sends a first media configuring message to the first media providing apparatus, where the first media configuring message includes an individual media capture and/or a multi-content media capture that is selected by the first media using apparatus according to the first media advertisement message; and the first media using apparatus receives and displays a media stream that is sent by the first media providing apparatus and corresponds to the individual media capture and/or the multi-content media capture selected according to the first media configuring message. Therefore, sites can provide multi-content media captures, switching between media captures provided by the sites is implemented, and media content receiving and sending parties can negotiate about switching content and a switching policy.

In Embodiment 5 of a multi-content media communications method according to the present disclosure, based on the method embodiment shown in FIG. 4, the first media using apparatus generates media content configuring options on a conference terminal according to the first media advertisement message, and generates the first media configuring message according to selection made by an attendee and sends the first media configuring message to the first media providing apparatus, namely, a conference center, where the media content configuring options include information about the multi-content media capture and the individual media captures included in compounding for the multi-content media capture.

Furthermore, after receiving the first media advertisement message sent by an MCU, a conference terminal serving as the first media using apparatus may further generate the media content configuring options on the conference terminal in a site according to the first media advertisement message, which, for example, include:

(1) Media capture content, for example, an available individual media capture and multi-content media capture.

(2) Compounding policy information, where its value may be "voice", that is, a policy in a switching advertisement message provided by the corresponding MCU is equal to voice activity. The value may also be "role", that is, the policy in the switching advertisement message provided by the corresponding MCU is equal to a role or a role/speaker, where there may be further different options for the role such as: a speaker, an audience, and the like, or only the role may be selected, and the MCU selects, according to a priority, an image of a type of role for switching. The value may also be "image quality", that is, the first media advertisement message provided by the corresponding MCU includes information about media capture image quality, and a second media advertisement message provided by each site also includes the information about media capture image quality, for example, VC0{role=audience,capturearea=left, resolution=1080p}, where resolution=1080p indicates that an image resolution is 1080p, or a value of a switching policy may also be "round robin", for example, a media capture image of another site are rotationally switched in a certain site (a site of a conference main speaker) according to a certain time.

(3) A compounding manner, such as temporal switching or spatial compounding.

(4) Scene synchronization, such as switching according to a site, where scene synchronization is supported, or switching according to a screen, where media captures are switched independently.

The switching according to a site refers to overall switching according to a site, that is, media capture images of a same site are simultaneously displayed on a screen of a receiving party, for example, a site receiving party selects, according to a screen receiving capability of a site, a site in which all media capture images of a peer site can be completely displayed, to perform overall switching.

The switching according to a screen refers to switching according to a single media capture image.

Each site attendee may select one or a combination of multiple options of the foregoing options, and the options may further include, for example, an image content preview provided by the MCU.

In this embodiment, a first media using apparatus generates media content configuring options on a conference terminal according to a first media advertisement message, and generates a first media configuring message according to selection made by an attendee and sends the first media configuring message to a first media providing apparatus, namely, a conference center, where the media content configuring options include information about a multi-content media capture and individual media captures included in compounding for the multi-content media capture. Therefore, switching between media captures provided by sites is implemented, and media content receiving and sending parties can negotiate about switching content and a switching policy.

Figure 5:
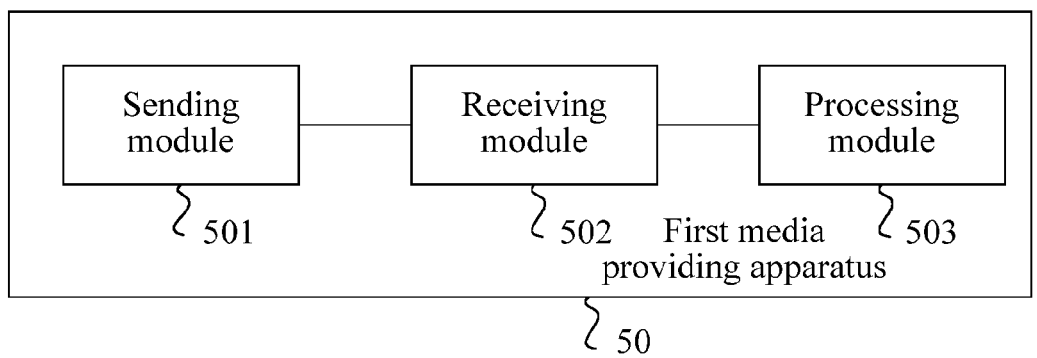
FIG. 5 is a schematic structural diagram of Embodiment 1 of a first media providing apparatus according to the present disclosure.

FIG. 5 is a schematic structural diagram of Embodiment 1 of a first media providing apparatus according to the present disclosure. The first media providing apparatus in this embodiment may be a conference terminal of each site, and may also be a conference center, for example, an MCU. As shown in FIG. 5, a first media providing apparatus 50 in this embodiment may include: a sending module 501 and a receiving module 502. The sending module 501 is configured to send a first media advertisement message to a first media using apparatus, where the first media advertisement message includes at least one individual media capture carrying a capture identifier and capture attribute information, and at least one multi-content media capture carrying a capture identifier, where the multi-content media capture is compounded of more than one individual media capture in the first media advertisement message. The receiving module 502 is configured to receive a first media configuring message sent by the first media using apparatus, where the first media configuring message includes an individual media capture and/or a multi-content media capture that is selected by the first media using apparatus according to the first media advertisement message. The sending module 501 is further configured to send a corresponding media stream to the first media using apparatus according to the individual media capture and/or the multi-content media capture included in the first media configuring message received by the receiving module 502.

The first media providing apparatus in the embodiment may be configured to execute the technical solution in the method embodiment shown in FIG. 1, and implementation principles and technical effects thereof are similar and are not described herein again.

Preferably, the first media advertisement message further includes at least one capture scene entry carrying an entry identifier, where each capture scene entry includes at least one individual media capture collected at a same scene and/or at least one multi-content media capture; and correspondingly, content of the multi-content media capture includes more than one individual media capture and/or capture scene entry.

Preferably, the first media providing apparatus is further a conference center, and the receiving module 502 is further configured to: before the sending module 501 sends the first media advertisement message to the first media using apparatus, receive a second media advertisement message sent by each site in a multi-party conference, where the second media advertisement message includes at least one individual media capture carrying a capture identifier and capture attribute information and/or at least one multi-content media capture carrying a capture identifier; and correspondingly, the first media providing apparatus further includes: a processing module 503 configured to generate the first media advertisement message according to the second media advertisement message. The processing module 503 is further configured to: when identifier conflict occurs between individual media captures, multi-content media captures, and capture scene entries of different sites, perform, by the conference center, renumbering, so as to ensure that the individual media capture and the multi-content media capture in the first media advertisement message each have a unique capture identifier, and the capture scene entry has a unique entry identifier.

Preferably, the processing module 503 is further configured to: set encoding group attribute information in the individual media capture and/or the multi-content media capture, so as to determine encoding that can be correspondingly used for the individual media capture and/or the multi-content media capture, and the number of media streams that can be simultaneously sent by the first media providing apparatus.

Preferably, the multi-content media capture is compounded of more than one individual media capture in the first media advertisement message, which includes that: the more than one individual media capture is compounded in a temporal or spatial manner.

The compounding manner is set by adding an attribute value of the maximum number of captures to the multi-content media capture, and indicates the maximum number of individual media captures that can be simultaneously encoded in the multi-content media capture. When the attribute value of the maximum number of captures is 1, it indicates that the more than one individual media capture is compounded according to time, and when the attribute value of the maximum number of captures is greater than 1, it indicates that the more than one individual media capture is compounded according to space.

Preferably, that when the attribute value of the maximum number of captures is greater than 1, it indicates that the more than one individual media capture is compounded according to space includes: adding a capture area attribute to the multi-content media capture to indicate information about spatial composition positions of different individual media captures.

Preferably, the multi-content media capture further includes: compounding policy information for determining a rule according to which content in the multi-content media capture is displayed.

Preferably, the processing module 503 is further configured to: when the first media advertisement message includes more than one multi-content media capture carrying a capture identifier, set a scene synchronization attribute in different multi-content media captures, where the different multi-content media captures with a same value of the scene synchronization attribute simultaneously perform switching of individual media captures, so as to ensure that individual media captures after the switching come from a same capture scene.

Preferably, the individual media capture and/or the multi-content media capture included in the first media configuring message is: all or some of the individual media capture and/or the multi-content media capture included in the first media advertisement message.

Figure 6:
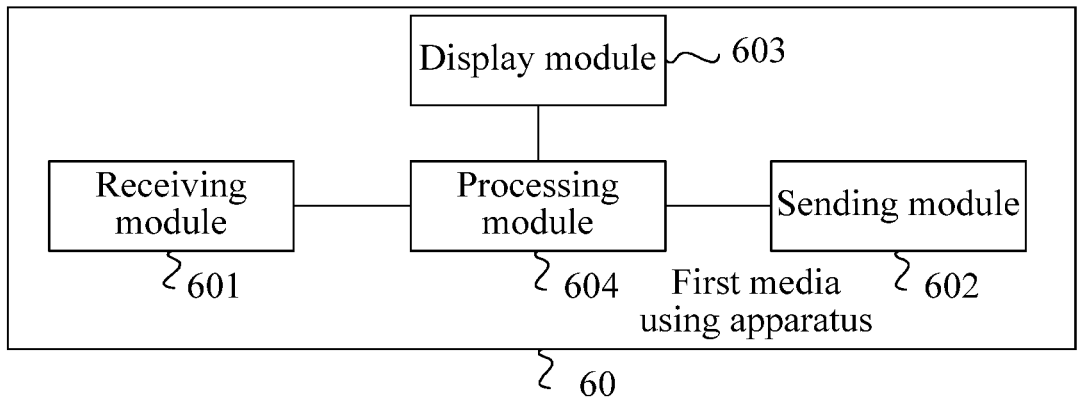
FIG. 6 is a schematic structural diagram of Embodiment 1 of a first media using apparatus according to the present disclosure.

FIG. 6 is a schematic structural diagram of Embodiment 1 of a first media using apparatus according to the present disclosure. The first media using apparatus in this embodiment may be a conference terminal of each site. As shown in FIG. 6, a first media using apparatus 60 in this embodiment may include: a receiving module 601, a sending module 602, and a display module 603. The receiving module 601 is configured to receive a first media advertisement message sent by a first media providing apparatus, where the first media advertisement message includes at least one individual media capture carrying a capture identifier and capture attribute information, and at least one multi-content media capture carrying a capture identifier, where the multi-content media capture is compounded of more than one individual media capture in the first media advertisement message. The sending module 602 is configured to send a first media configuring message to the first media providing apparatus, where the first media configuring message includes an individual media capture and/or a multi-content media capture that is selected by the first media using apparatus according to the first media advertisement message. The receiving module 601 is further configured to receive a media stream that is sent by the first media providing apparatus and corresponds to the individual media capture and/or the multi-content media capture included in the first media configuring message. The display module 603 is configured to display the media stream that is sent by the first media providing apparatus and corresponds to the individual media capture and/or the multi-content media capture included in the first media configuring message.

The first media using apparatus in the embodiment may be configured to execute the technical solution in the method embodiment shown in FIG. 4, and implementation principles and technical effects thereof are similar and are not described herein again.

Preferably, in this embodiment, the first media using apparatus 60 may further include: a processing module 604 configured to generate media content configuring options on a conference terminal according to the first media advertisement message, and generate the first media configuring message according to selection made by an attendee, where the media content configuring options include information about the multi-content media capture and the individual media captures included in compounding for the multi-content media capture in the first media advertisement message, where the sending module 602 is further configured to send the first media configuring message to the first media providing apparatus, namely, a conference center.

The first media using apparatus in the embodiment may be configured to execute the technical solution in method embodiment 4, and implementation principles and technical effects thereof are similar and are not described herein again.

Preferably, the first media advertisement message further includes at least one capture scene entry carrying an entry identifier, where each capture scene entry includes at least one individual media capture collected at a same scene and/or at least one multi-content media capture; and correspondingly, content of the multi-content media capture includes more than one individual media capture and/or capture scene entry.

Preferably, the sending module 602 is further configured to: before the receiving module 601 receives the first media advertisement message sent by the first media providing apparatus, send a second media advertisement message to the conference center, where the second media advertisement message includes at least one individual media capture carrying a capture identifier and capture attribute information and/or at least one multi-content media capture carrying a capture identifier, so that the conference center generates the first media advertisement message according to the second media advertisement message.

Preferably, the multi-content media capture is compounded of more than one individual media capture in the first media advertisement message, which includes that: the more than one individual media capture is compounded in a temporal or spatial manner, where the compounding manner is set by adding an attribute value of the maximum number of captures to the multi-content media capture, and indicates the maximum number of individual media captures that can be simultaneously encoded in the multi-content media capture. When the attribute value of the maximum number of captures is 1, it indicates that the more than one individual media capture is compounded according to time, and when the attribute value of the maximum number of captures is greater than 1, it indicates that the more than one individual media capture is compounded according to space.

Preferably, that when the attribute value of the maximum number of captures is greater than 1, it indicates that the more than one individual media capture is compounded according to space includes: adding a capture area attribute to the multi-content media capture to indicate information about spatial composition positions of different individual media captures.

Preferably, the multi-content media capture further includes: compounding policy information for determining a rule according to which content in the multi-content media capture is displayed.

Preferably, the individual media capture and/or the multi-content media capture included in the first media configuring message is: all or some of the individual media capture and/or the multi-content media capture included in the first media advertisement message.

Figure 7:
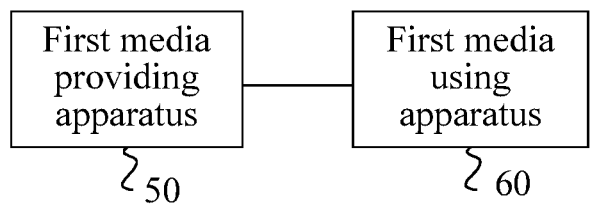
FIG. 7 is a schematic structural diagram 1 of Embodiment 1 of a multi-content media communications system according to the present disclosure.
Figure 8:
FIG. 8 is a schematic structural diagram 2 of Embodiment 1 of a multi-content media communications system according to the present disclosure.

FIG. 7 is a schematic structural diagram 1 of Embodiment 1 of a multi-content media communications system according to the present disclosure. FIG. 8 is a schematic structural diagram 2 of Embodiment 1 of a multi-content media communications system according to the present disclosure. As shown in FIG. 7, the system in this embodiment includes: at least one first media providing apparatus 50 and at least one first media using apparatus 60. The first media providing apparatus 50 may use any one of the structures in the structure embodiments of the first media providing apparatus, and correspondingly can execute any one of the technical solutions in method embodiments 1 and 3. The first media using apparatus 60 may use any one of the structures in the structure embodiments of the first media using apparatus, and correspondingly can execute any one of the technical solutions in method embodiments 4 and 5. Implementation principles and technical effects thereof are similar and are not described herein again.

Preferably, as shown in FIG. 8, the system in this embodiment may further include: a conference center, which may use any one of the structures in the structure embodiments of the first media providing apparatus, and correspondingly can execute the technical solution in method embodiment 2.

Figure 9:
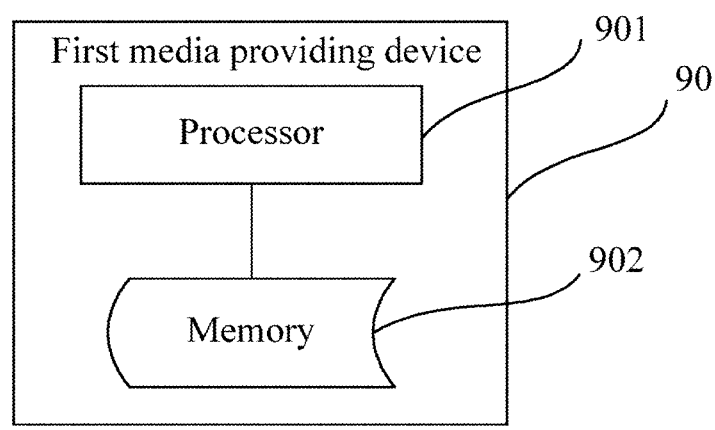
FIG. 9 is a schematic structural diagram of Embodiment 1 of a first media providing apparatus according to the present disclosure.

FIG. 9 is a schematic structural diagram of Embodiment 1 of a first media providing apparatus according to the present disclosure. As shown in FIG. 9, a first media providing apparatus 90 provided in this embodiment includes a processor 901 and a memory 902. The memory 902 stores an execution instruction. When the first media providing apparatus 90 runs, the processor 901 communicates with the memory 902, and the processor 901 invokes the execution instruction in the memory 902, so that the first media providing apparatus 90 executes the method of any one of the technical solutions according to method embodiments 1 to 3 of the present disclosure. Implementation principles and technical effects thereof are similar and are not described herein again.

Figure 10:
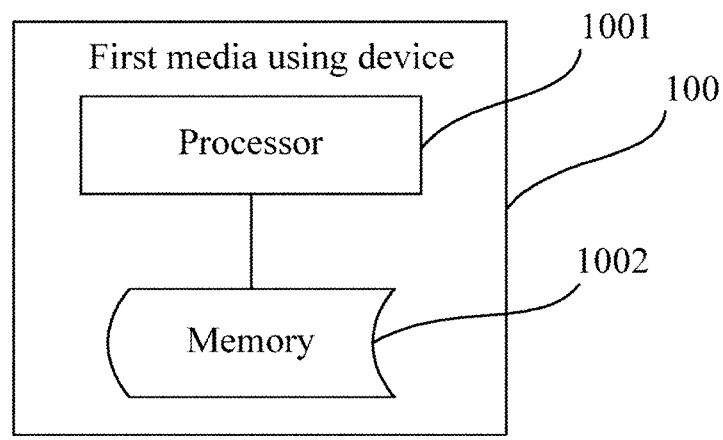
FIG. 10 is a schematic structural diagram of Embodiment 1 of a first media using apparatus according to the present disclosure.

FIG. 10 is a schematic structural diagram of Embodiment 1 of a first media using apparatus according to the present disclosure. As shown in FIG. 10, a first media using apparatus 100 provided in this embodiment includes a processor 1001 and a memory 1002. The memory 1002 stores an execution instruction. When the first media using apparatus 100 runs, the processor 1001 communicates with the memory 1002, and the processor 1001 invokes the execution instruction in the memory 1002, so that the first media using apparatus 100 executes the method of any one of the technical solutions according to method embodiments 4 to 5 of the present disclosure. Implementation principles and technical effects thereof are similar and are not described herein again.

In the several embodiments provided in the present disclosure, it should be understood that the disclosed apparatus and method may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware combining a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) or a processor to perform a part of the steps of the methods described in the embodiments of the present disclosure. The foregoing storage medium includes: any medium that can store program code, such as a universal serial bus (USB) flash drive, a removable hard disk, a read-only memory (ROM), a random access memory (RAM), a magnetic disk, or an optical disc.

It can be clearly understood by persons skilled in the art that, for the purpose of convenient and brief description, division of the foregoing functional modules is used as an example for illustration, in actual implementation, the foregoing functions can be allocated to different modules and implemented according to the need, that is, the internal structure of the apparatus is divided into different functional modules to implement all or a part of the foregoing functions. For a detailed working process of the foregoing apparatus, reference may be made to a corresponding process in the foregoing method embodiments, and details are not described herein again.

Finally, it should be noted that the foregoing embodiments are merely intended for describing the technical solutions of the present disclosure rather than limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, as long as such modifications or replacements do not make the essence of corresponding technical solutions to depart from the scope of the technical solutions of the embodiments of the present disclosure.

What is claimed is:

1. A multi-content media communications method, comprising:
   sending, by a first media providing apparatus, a first media advertisement message to a first media using apparatus, wherein the first media advertisement message comprises at least one individual media capture associated with a telepresence conference and at least one multi-content media capture associated with the telepresence conference, wherein each of the at least one individual media capture carries a first capture identifier and capture attribute information, and each of the at least one multi-content media capture carries a second capture identifier;
   receiving, by the first media providing apparatus, a first media configuring message sent by the first media using apparatus, wherein the first media configuring message comprises an individual media capture or a multi-content media capture that is selected by the first media using apparatus according to the first media advertisement message; and
   sending, by the first media providing apparatus, a corresponding media stream to the first media using apparatus according to the selected individual media capture or multi-content media capture.

2. The method according to claim 1, wherein the first media advertisement message comprises at least one capture scene entry carrying an entry identifier, wherein each of the at least one capture scene entry comprises the individual media capture collected at a same scene or the multi-content media capture.

3. The method according to claim 2, wherein the first media providing apparatus is a conference center, wherein before sending, by the first media providing apparatus, the first media advertisement message to the first media using apparatus, the method further comprises:
   receiving, by the conference center, a second media advertisement message sent by the first media using apparatus of each site in a multi-party conference, wherein the second media advertisement message comprises the individual media capture or the multi-content media capture;
   generating, by the conference center, the first media advertisement message according to the second media advertisement message; and
   performing, by the conference center, renumbering when identifier conflict occurs between individual media captures, multi-content media captures, and capture scene entries of different sites to assign a unique capture identifier to each of the individual media capture and the multi-content media capture in the first media advertisement message, and a unique entry identifier to each of the capture scene entry.

4. The method according to claim 1, further comprising setting, by the first media providing apparatus, encoding group attribute information in the individual media capture or the multi-content media capture.

5. The method according to claim 1, wherein the multi-content media capture is compounded of more than one individual media capture in the first media advertisement message, wherein the more than one individual media capture is compounded in a temporal or spatial manner, wherein a compounding manner is set by adding an attribute value of a maximum number of captures to the multi-content media capture, wherein the attribute value of the maximum number of captures being 1 indicates that the more than one individual media capture is compounded according to time, and wherein the attribute value of the maximum number of captures being greater than 1 indicates that the more than one individual media capture is compounded according to space.

6. The method according to claim 5, wherein the attribute value of the maximum number of captures being greater than 1 indicates that the more than one individual media capture is compounded according to space, and wherein the method further comprises adding a capture area attribute to the multi-content media capture to indicate information about spatial composition positions of different individual media captures.

7. The method according to claim 1, wherein the multi-content media capture further comprises compounding policy information for determining a rule according to which content in the multi-content media capture is displayed.

8. The method according to claim 1, wherein when the first media advertisement message comprises more than one multi-content media capture, the first media providing apparatus sets a scene synchronization attribute in different multi-content media captures, and wherein the different multi-content media captures with a same value of the scene synchronization attribute simultaneously perform switching of individual media captures, in order to ensure that wherein the individual media captures after the switching come from a same capture scene.

9. An apparatus, comprising:
at least one hardware processor;
a non-transitory computer-readable storage medium coupled to the at least one hardware processor and storing programming instructions for execution by the at least one hardware processor, wherein the programming instructions, when executed, instruct the at least one hardware processor to:
send a first media advertisement message to a first media using apparatus, wherein the first media advertisement message comprises at least one individual media capture associated with a telepresence conference and at least one multi-content media capture associated with the telepresence conference, wherein each of the at least one individual media capture carries a first capture identifier and capture attribute information, and each of the at least one multi-content media capture carries a second capture identifier;
receive a first media configuring message sent by the first media using apparatus, wherein the first media configuring message comprises the individual media capture or the multi-content media capture that is selected by the first media using apparatus according to the first media advertisement message; and
send a corresponding media stream to the first media using apparatus according to the selected individual media capture or multi-content media capture.

10. The apparatus according to claim 9, wherein before sending the first media advertisement message to the first media using apparatus, the programming instructions, when executed, instruct the at least one hardware processor to:
receive a second media advertisement message sent by the first media using apparatus of each site in a multi-party conference, wherein the second media advertisement message comprises the individual media capture, or the multi-content media capture;
generate the first media advertisement message according to the second media advertisement message; and
perform renumbering when identifier conflict occurs between individual media captures, multi-content media captures, and capture scene entries of different sites, to assign a unique capture identifier to each of the individual media capture and the multi-content media capture in the first media advertisement message, and a unique entry identifier to each of the capture scene entry.

11. The apparatus according to claim 9, wherein the programming instructions, when executed, instruct the at least one hardware processor to set encoding group attribute information in the individual media capture or the multi-content media capture.

12. The apparatus according to claim 9, wherein the first media advertisement message comprises at least one capture scene entry carrying an entry identifier, and wherein each of the at least one capture scene entry comprises the individual media capture collected at a same scene or the multi-content media capture.

13. The apparatus according to claim 9, wherein the multi-content media capture comprises compounding policy information for determining a rule according to which content in the multi-content media capture is displayed.

14. An apparatus, comprising:
at least one hardware processor;
a non-transitory computer-readable storage medium coupled to the at least one hardware processor and storing programming instructions for execution by the at least one hardware processor, wherein the programming instructions, when executed, instruct the at least one hardware processor to:
receive a first media advertisement message sent by a first media providing apparatus, wherein the first media advertisement message comprises at least one individual media capture associated with a telepresence conference and at least one multi-content media capture associated with the telepresence conference, wherein each of the at least one individual media capture carries a first capture identifier and capture attribute information, and each of the at least one multi-content media capture carries a second capture identifier;
send the first media configuring message to the first media providing apparatus, wherein the first media configuring message comprises an individual media capture or a multi-content media capture that is selected by the first media using apparatus according to the first media advertisement message;
receive a media stream that is sent by the first media providing apparatus and corresponds to the individual media capture and/or the multi-content media capture comprised in the first media configuring message; and
display the media stream that is sent by the first media providing apparatus and corresponds to the individual media capture or the multi-content media capture comprised in the first media configuring message.

15. The apparatus according to claim 14, wherein the programming instructions, when executed, instruct the at least one hardware processor to:
generate media content configuring options on a conference terminal according to the first media advertisement message;
generate the first media configuring message according to a selection made by an attendee, wherein the media content configuring options comprise information about the multi-content media capture and individual media captures that are compounded to form the multi-content media capture in the first media advertisement message; and
send the first media configuring message to the first media providing apparatus.

16. The apparatus according to claim 14, wherein the first media advertisement message comprises at least one capture scene entry carrying an entry identifier, and wherein each of the at least one capture scene entry comprises at least one individual media capture collected at a same scene or at least one multi-content media capture.

* * * * *

UNITED STATES PATENT AND TRADEMARK OFFICE
CERTIFICATE OF CORRECTION

PATENT NO. : 9,787,834 B2
APPLICATION NO. : 15/014252
DATED : October 10, 2017
INVENTOR(S) : Weiwei Yang Page 1 of 1

It is certified that error appears in the above-identified patent and that said Letters Patent is hereby corrected as shown below:

In the Claims

In Column 26, In Line 65, In Claim 8, after "captures," delete "in order to ensure that".

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*